United States Patent [19]

Thomas et al.

[11] Patent Number: 4,745,135

[45] Date of Patent: May 17, 1988

[54] POLYURETHANES PREPARED FROM LIQUID CRYSTAL-CONTAINING POLYOLS

[75] Inventors: Oomman P. Thomas; Robert B. Turner, both of Lake Jackson, Tex.

[73] Assignee: The Dow Chemical Company, Midland, Mich.

[21] Appl. No.: 73,038

[22] Filed: Jul. 14, 1987

Related U.S. Application Data

[63] Continuation-in-part of Ser. No. 878,460, Jun. 25, 1986, abandoned.

[51] Int. Cl.$^4$ .............................................. C08G 18/14
[52] U.S. Cl. ..................... 521/114; 521/128; 521/130; 521/135; 521/137; 524/198; 524/212; 524/244; 524/714; 525/127; 525/128; 525/130; 264/51
[58] Field of Search .............. 521/114, 128, 130, 135, 521/137, 163, 164, 167, 172, 173, 174, 176, 177; 524/198, 212, 244, 310, 377, 714, 762, 765, 773, 776, 251, 269; 525/127, 128, 130; 252/182; 264/51, 328.1, 328.6, 328.8

[56] References Cited

U.S. PATENT DOCUMENTS 3,872,050  3/1975  Benton et al. ..................... 524/774

FOREIGN PATENT DOCUMENTS 56-152830  11/1981  Japan .

OTHER PUBLICATIONS

Verbit et al., *Mol. Cryst. Liq. Cryst.*, 1975, 30, pp. 87–99, 1972.
Tanaka et al., *Kobunshi Ronbunsku*, 43, pp. 311–314, 1986.
Sato, *Porima Daijesuto*, 37 (6), pp. 10–16, 1985.
Jadhav et al., "Liquid Crystalline Polyurethanes" Gordon Research Conference, Jul. 7, 1986.
Iimura et al., *Makromol. Chem*, 182, pp. 2569–2575, 1981.
Tanaka et al., *Polym. Prep. Japan*, 33(7), pp. 1647–1650, 1984.

*Primary Examiner*—Maurice J. Welsh

[57] ABSTRACT

Polyurethanes are prepared from a polyol which itselve contains liquid crystalline moieties or which contains dispersed or dissolved liquid crystalline polymers. The use of this polyol is found to provide improved properties to polyurethanes, especially flexible polyurethane foams, which exhibit improved load bearing.

50 Claims, No Drawings

POLYURETHANES PREPARED FROM LIQUID CRYSTAL-CONTAINING POLYOLS

CROSS-REFERENCE TO RELATED APPLICATION

This is a continuation-in-part of application Ser. No. 878,460, filed June 25, 1986, and now abandoned.

BACKGROUND OF THE INVENTION

This invention relates to polyurethane polymers prepared from liquid crystal-containing, active hydrogen-containing materials.

Various polymers are prepared from compounds and polymers which contain a plurality of active hydrogen atoms. Principal among these polymers are the polyurethanes and polyureas. In preparing these polymers, it is normally desirable to obtain the best possible physical properties. For example, when a flexible polymeric foam is prepared, it is often desirable to produce a foam which has good load-bearing, resiliency, and tensile properties.

The materials most commonly used in preparing polyurethanes and/or polyureas are polyethers and polyesters which contain two or more active hydrogen-containing groups. Although excellent polymers, both cellular and noncellular, are produced therefrom, it is desirable in certain instances to further improve their properties. One known method of improving the properties of polyurethanes made from polyesthers or polyesters is to employ a dispersion of polymer particles in a continuous polyether or polyester polyol phase. These so-called polymer polyols or copolymer polyols contain addition polymers, polyurea or polyurethane-urea particles, or other polymers dispersed through the polyol as a plurality of colloidal (10–1000 nm) particles. The dispersed particles have been shown to improve various properties of the resulting cellular polyurethane and/or polyurea, and often perform a cell-opening function in the production of polyurethane and/or polyurea foam.

However, even with the use of a polymer polyol, improvement in certain properties of the polyurethane and/or polyurea polymer is desired. In particular, it is desirable to provide a cellular polyurethane and/or polyurea having a high modulus as later defined. Such foams are particularly suitable for automobile or other seating, in which the foam desirably feels soft as one sits on it, yet provides sufficient support for adequate comfort.

It would therefore be desirable to provide a polyurethane and/or polyurea polymer having improved physical properties and to provide an active hydrogen-containing composition which reacts with a polyiscyanate to produce a polyurethane and/or polyurea polymer having improved properties.

SUMMARY OF THE INVENTION

In one aspect, this invention is a solution or colloidal dispersion of a liquid crystalline polymer in an active hydrogen-containing compound having an average of at least two isocyanate-reactive groups per molecule.

In another aspect, this invention is a polyurethane and/or polyurea polymer prepared by reacting a polyisocyanate with a polyol containing a mesogenic moiety or plurality thereof (hereinafter "liquid crystal-containing polyol) and/or a solution or dispersion of a liquid crystalline polymer in an active hydrogen-containing compound having an average of at least two isocyanate-reactive groups per molecule (hereinafter "liquid crystal dispersion").

In another aspect, this invention is a polyurethane and/or polyurea foam containing a liquid crystalline polymer.

In another aspect, this invention is a polyurethane and/or polyurea foam which is prepared from a liquid crystal-containing polyol.

In yet another aspect, this invention is a crosslinked, non-cellular or microcellular polyurethane and/or polyurea polymer containing a liquid crystalline polymer.

In still another aspect, this invention is a crosslinked, non-cellular or microcellular polyurethane and/or polyurea polymer which is prepared from a liquid crystal-containing polyol.

The inclusion of a liquid crystal-containing polyol or a liquid crystal dispersion in an active hydrogen-containing composition has surprisingly been found to yield significant and unexpected improvements in the physical properties of polyurethane and/or polyurea polymers prepared therefrom. In particular, cellular polyurethane and/or polyurea polymers and from these solutions have excellent firmness and high moduli.

DETAILED DESCRIPTION OF THE INVENTION

In one aspect of this invention, a liquid crystal-containing polyol is reacted with a polyisocyanate to form a polyurethane and/or polyurea polymer. The term "polyol" is used herein to broadly include compounds having a plurality of isocyanate-reactive groups, including hydroxyl, primary or secondary amine, carboxylic acid or mercaptan groups. The liquid crystal-containing polyol can be any material which reacts polyfunctionally with a polyisocyanate, and which contains liquid crystalline (mesogenic) groups. Note that although the liquid crystal-containing polyol contains groups which, when present in small molecules are liquid crystalline, the liquid crystal-containing polyol itself may or may not be mesogenic, although it is preferably mesogenic. Liquid crystalline (mesogenic) groups are moieties which can aggregate to form a nematic, smectic or twisted nematic (cholesteric) ordering. In the liquid crystal-containing polyol, the mesogenic moieties can form part of the backbone of the polyol, or be present as pendant groups. Exemplary such compounds include hydroxyl-terminated polyesters containing an internal grouping as represented by the structure

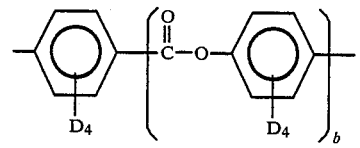

wherein b is as a number from about 1 to about 10, preferably from about 1 to about 3, more preferably about 1 to about 2, each D is independently hydrogen or an inert substituent which, when ortho to the ester linkage can form a cyclic structure with the ester linkage and the aromatic rings. Another class of suitable such compounds include mesogen-initiated polyethers. These are advantageously prepared by adding an alkylene oxide to a mesogenic compound having a plurality of hydroxyl, amine or other groups which react with the alkylene oxide in a ring-opening reaction. Propylene oxide and/or ethylene oxide derivatives of cellulose or a hydroxyalkylcellulose are examples of mesogen-initiated polyols. Other mesogen-initiate polyols include those initiated with a bisphenol such as represented by the structure,

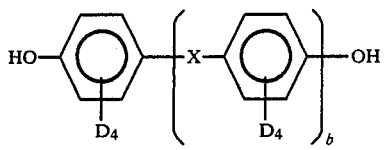

wherein D and b are as described before, and —X— is a covalent bond or rigid linkage unit. Suitable rigid units X include cycloaliphatic radical, a heterocyclic radical,

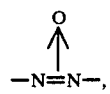

—COO—, —C=C—, —C≡C—, —N=C—, —HCO—, —HCOO—, —N=N— and the like. The linkage X can also from a cyclic structure with the aromatic rings and the groups D which are ortho to the X linkage.

Of particular interest are liquid crystal-containing polyols prepared by reacting an ethylenically unsaturated polyether with an ethylenically unsaturated liquid crystalline monomer and, preferably, a secondary monomer having both ethylenic unsaturation and an isocyanate-reactive group. Suitable ethylenically unsaturated polyethers include hydroxyl-terminated polymers of propylene oxide and/or ethylene oxide which are partially or completely capped with a monomer which is reactive with the hydroxyl group of the polyether and which also contains ethylenic unsaturation, such as an ethylenically unsaturated isocyanate or carboxylic acid chloride. Especially suitable ethylenically unsaturated polyethers are described, for example, in U.S. Pat. Nos. 4,394,491 and 4,513,124. These ethylenically unsaturated polyethers are then reacted with a mixture of the liquid crystalline monomer and the secondary monomer. Especially suitable as the secondary monomer are those such as hydroxyethylmethacrylate, hydroxyethylacrylate, hydroxyl-propylacrylate, and the like. In preparing such liquid crystalline polymers, the liquid crystalline monomer comprises at least about 25, more preferably at least about 35-90, most preferably about 50-80 mole percent of the liquid crystalline and secondary monomers. The relative amounts of monomers and unsaturated polyol are preferably chosen that the resulting liquid crystal-containing polyol is colloidally dispersable, preferably soluble, in additional amounts of a polyether polyol. Liquid crystal-containing polyols prepared in this manner have several particular advantages, such as excellent solubility in polyether polyols. A further advantage is that the use of the secondary monomer creates a polymer having a relatively high functionality, which often improves certain properties of polyurethanes, particular cellular polyurethanes, made therefrom.

The liquid crystal-containing polyol may constitute the sole active hydrogen-containing compound used in preparing the polyurethane/and or polyurea, or may be dissolved in, dispersed in or blended with another active hydrogen-containing compound. In either case, it is preferred that the liquid crystalline moieties contained therein constitute about 1 to about 80, preferably about 3 to about 60, more preferably about 3 to about 25 percent by weight of the active hydrogen-containing compound(s).

Alternatively, or in conjunction with the liquid crystal-containing polyol, a liquid crystal dispersion is used to prepare a polyurethane and/or polyurea polymer. The liquid crystal dispersion of this invention comprises an active hydrogen-containing compound, or mixture thereof, in which is dissolved or dispersed a liquid crystalline polymer. The liquid crystalline polymer is a non-isocyanate reactive polymer which is soluble or colloidally dispersable in an active hydrogen-containing compound, and which contains a plurality of pendant liquid crystalline moieties attached to the backbone of the polymer, and/or backbone containing liquid crystalline moieties. By colloidally dispersible, it is meant that the polymer can be dispersed in an active hydrogen-containing compound as a plurality of particles having an average diameter of about 10–1000 nm.

The molecular weight of the liquid crystalline polymer is not especially critical if the liquid crystalline polymer is soluble or colloidally dispersable in the active hydrogen-containing compound, and it is sufficiently high that the liquid crystalline moieties can aggregate to form a mesomophic structure. Mesomorphic structures are generally formed in the polymer when the liquid crystalline moiety has an aspect ratio of at least about 2.25, preferably at least about 2.4. It is also preferable that the molecular weight and composition of the liquid crystalline polymer are chosen together such that the polymer can undergo a phase transition to a mesomorphic state at some temperature below that at which the polymer and the active hydrogen-containing compound degrade. Preferably, the dispersed liquid crystalline polymer undergoes such phase transition under conditions of temperature and shear such as are encountered in the reaction of the liquid crystal dispersion with a polyisocyanate to form a polyurethane and/or polyurea polymer. More preferably, the liquid crystalline polymer undergoes such phase change at a temperature from about 40° to 130° C.

One important class of liquid crystalline polymers are addition polymers prepared by homopolymerizing or copolymerizing an ethylenically unsaturated monomer which exhibits liquid crystalline characteristics when in polymerized form. Note that the monomer itself does not have to be liquid crystalline, as long as polymers thereof are mesogenic. Exemplary such monomers (hereinafter liquid crystalline monomers) are described, for example, in Blumstein, et al, "Liquid Crystalline Order in Polymers with Mesogenic Side Groups", *Liquid Crystalline Order in Polymers*, A. Blumstein, ed., Academic Press, Inc., New York (1978), incorporated herein by reference. Ethylenically unsaturated monomers which contain substantially linear, rigid groups are useful herein. Such monomers include ethylenically unsaturated biphenyls; cyclohexyl-phenyl compounds; certain conjugated dienes; diverse monomers containing ethylenic unsaturation and an internal grouping having the structure

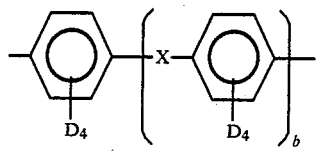

wherein b, X, and D are as described before; ethylenically unsaturated steroids and other monomers such as are described in Tables 1–4, pages 108–120 of Blumstein, supra. Three major types of liquid crystalline monomers include derivatives of benzoic acid, Schiff base derivatives and steroid derivatives. In addition, various miscellaneous monomers are suitable.

Benzoic acid derivatives can be represented by the structure

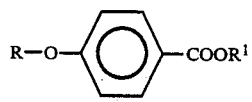

wherein R represents an inertly substituted radical having polymerizable ethylenic unsaturation and $R^1$ represents hydrogen or an inertly substituted organic radical, preferably devoid of polymerizable ethylenic unsaturation. By "inertly substituted", it is meant that the moiety referred to has no substituent group, or has substituent groups which do not undesirably affect the mesogenic character thereof. Such benzoic acid derivatives are conveniently prepared by reacting an acid chloride with a p-hydroxy benzoic acid or ester thereof according to the equation:

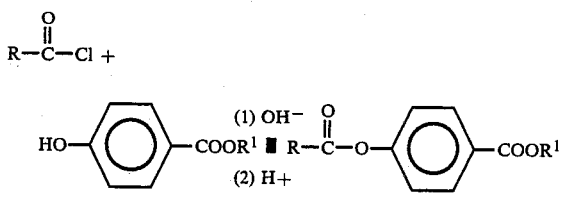

wherein R and $R^1$ are as defined before. Preferably, R is $H_2C=CH-$, $H_2C=C(CH)-$, $H_2C=C(CH)CH-$, $H_2C=CHCOOCH_2CH_2-$, $H_2C=C(CH_3)COOCH_2CH_2-$, or similar group. $R^1$ is preferably lower alkyl or hydrogen and most preferably hydrogen.

Suitable Schiff base derivatives comprise two major types, the styrene derivatives and the acryloyl or methacryloyl derivatives. The styrene derivatives can generally be represented by the structure

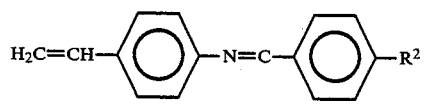

wherein $R^2$ is a radical which does not undesirably affect the mesogenic behavior of a polymer of the monomer or the solubility or dispersibility of the polymer in an active hydrogen-containing compound or polymer. Exemplary groups $R^2$ include $R^2$ include cyano, halogen, straight chain alkyl ether, alkyl, phenyl, cyclohexyl, $-CH=CHCOOR^3$, wherein $R^3$ is a straight chain alkyl, acetyl, carboxylic acid or ester group, amido group, or the like.

The styrene-based Schiff base derivatives are advantageously prepared by reacting p-amino styrene with a p-substituted benzaldehyde according to Equation II

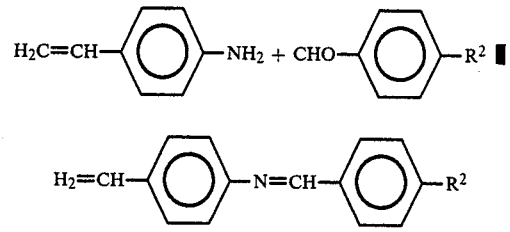

wherein $R^2$ is as defined before. The p-amino styrene itself can be prepared by the reduction of p-nitrostyrene or the dehydration of para-2-hydroxyethyl aniline.

The acryloyl or methacryloyl Schiff base derivatives are advantageously prepared by reacting the acid chloride with p-hydroxybenzaldehyde to form the unsaturated aldehyde, and further reacting the aldehyde with a para-substituted aniline, as illustrated by Equation III:

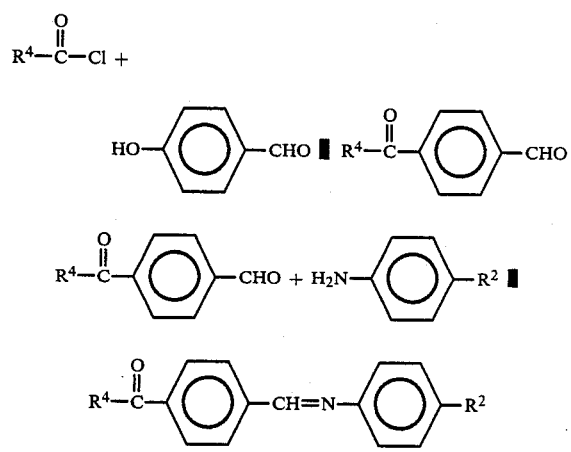

wherein $R^2$ is as defined before, and $R^4$ is $CH_2=CH-$ or $CH_2=C(CH_3)-$.

Suitable ethylenically unsaturated steroid derivatives include compounds containing polymerizable ethylenic unsaturation and a cyclopentanoperhydrophenanthrene moiety. Exemplary steroid derivatives include derivatives of cholesterol, cholestanol, doristerol, campesterol, β-sitosterol, stigmatserol, ergosterol, cycloartenol and the like which contain ethylenic unsaturation. Suitable steroid compounds which can be easily modified to impart ethylenic unsaturation are described on pp. 108–112 of Kelker and Hatz, *Handbook of Liquid Crystals*, Verlag Chemie, (1980). Of these, derivatives of cholesterol and cholestanol are preferred on the basis of cost and availability.

Suitable ethylenically unsaturated steroid derivatives can be prepared by reacting it with a compound having ethylenic unsaturation and a group which reacts with a hydroxyl group to form a bond to the oxygen atom, such as an unsaturated acid, an unsaturated acid chloride, unsaturated anhydride, unsaturated epoxide or unsaturated isocyanate. Alternatively, an unsaturated ester can by reacted with an ester of the corresponding steroid in a transesterification reaction to provide the unsaturated steroid derivative. Cholesterol and cholestanol derivatives can be represented by the structure

R—Y—A wherein A represents

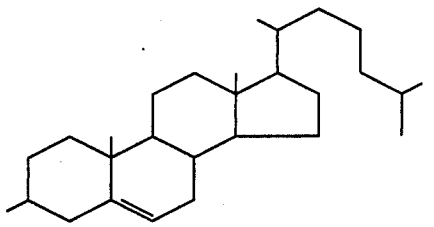

(VI)

or

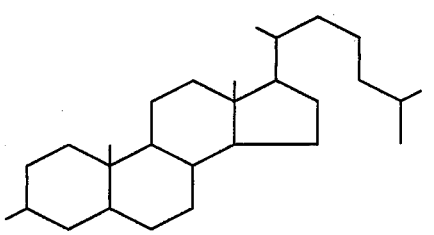

. (VI)

Y represents any linking group, advantageously —COO— or —N—COO— and R is as defined before. In such steroid derivatives, R is advantageously $CH_2\!=\!CH\!-\!$, $CH_2\!=\!C(CH_3)\!-\!$, trans-$CH_3CH\!=\!CH\!-\!$, $CH_2\!=\!CH\!-\!$, $CH_2\!=\!CH\!-\!(CH_2)_x\!-\!$ (wherein x is a number from about 1–10, preferably about 1–4), $CH_2\!=\!C(CH_3)COO(CH_2)_2\!-\!$, vinylbenzyl, vinylphenyl and the like, as well as a straight chain mono or poly-unsaturated hydrocarbyl group. Suitable steroid derivatives are described on Table 3, pages 116–117 of Blumstein, supra. Of such steroid derivatives, the cholesterol derivative of isocyanatoethyl methacrylate or other unsaturated isocyanate is preferred due to its ease of manufacture.

The liquid crystalline polymer containing pendant mesogenic groups can be prepared by a free-radical polymerization of an ethylenically unsaturated monomer as described before. Suitable processes for the free-radical polymerization of ethylenically unsaturated monomers are well known in the art, and reference is made thereto for the purposes of this invention. The polymerization is conducted under conditions such that the resulting polymer is soluble or dispersible in an active hydrogen-containing compound or polymer.

Solution polymerization techniques are particularly suitable for polymerizing the ethylenically unsaturated monomer. In such solution polymerization, the monomer is polymerized in the presence of an inert solvent. By "inert" it is meant that the solvent does not react with the monomer, or otherwise undesirably interfere with the polymerization. When a solvent is used, it is advantageously stripped from the liquid crystalline polymer after the polymer is dissolved or dispersed in the active hydrogen-containing compound. Alternatively, the monomer can be polymerized in situ in the active hydrogen-containing compound or polymer. In such in situ polymerization, it is common practice to employ a dispersant to aid in the solubility or dispersibility of the liquid crystalline polymer. Particularly suitable dispersants include adducts of the active hydrogen-containing compound and a difunctional compound having an active hydrogen-reactive group and an ethylenically unsaturated group, such as an ethylenically unsaturated isocyanate, carboxylic acid, carboxylic acid chloride and the like. Techniques for such in situ polymerization are taught, for example, in U.S. Pat. Nos. 4,460,715 and 4,394,491, incorporated by reference.

The polymerization is advantageously conducted in the presence of a source of free radicals. Any of the common free radical initiators such as the well-known organic peroxides, peroxyesters and azo compounds are suitable for that purpose. In addition, radiation or other free radical sources can be used.

The polymerization is advantageously conducted at a temperature from about $-20°$ C. to about $150°$ C. The optimum polymerization temperature is, of course, dependent on the particular monomer used, the particular free radical initiator used, if any, and other circumstances which are well known in polymerizing ethylenically unsaturated monomers.

In order to control the molecular weight of the polymer, it may be advantageous to adjust the level of initiator used, or to employ a chain transfer agent in the polymerization. Typically, the use of a greater quantity of a free radical initiator or chain transfer agent tends to decrease the molecular weight of the resulting polymer. Thus, a free radical initiator is advantageously employed in an amount from about 0.01 to about 10, preferably about 0.05 to about 5 parts per 100 parts monomer. Suitable chain transfer agents include, for example, mercaptans, carboxylic acids, halogen containing compounds and the like. These and other suitable chain transfer agents are described, for example, in European Patent Publication No. 0091036A2.

The liquid crystalline monomer may be homopolymerized or copolymerized with another monomer which may or may not be mesogenic. Any such copolymerization may be a random copolymerization, or a block or graft copolymerization. The sole limitation on such other monomer is that it must be of such composition and present in such an amount such that the polymer is mesomorphic. Typically, the polymer will be mesomorphoic when at least about 25, preferbly about 35–100, more preferably about 50–100 mole percent of the monomers employed in its preparation are liquid crystalline monomers.

Suitable non-mesogenic monomers which are useful comonomers for the liquid crystalline polymer include those described in U.S. Pat. No. 4,394,491, incorporated by reference. Of particular interest are the acrylic and methacrylic esters, particularly hdyroxyalkyl esters thereof such as hydroxyethylacrylate; the unsaturated nitriles, particularly acrylonitrile; and the vinyl aromatics, particularly styrene. In addition to polymers of ethylenically unsaturated monomers, polymers of other types of monomers are useful herein as long as the resulting polymer contains liquid crystalline pendant groups. Of particular interest are polypeptides such as poly(g-benzyl-L-glutamate) as described by DuPre, "Liquid Crystals", *Kirk-Othmer Encyclopedia of Chemical Technology*, 3d ed. Vol. 14, pp. 395–427, John Wiley and Sons, New York (1981), incorporated by reference.

Main chain liquid crystalline polymers, another useful class of liquid crystalline polymer, contain mesogenic moieties as part of the polymer backbone. Any of such polymers which are soluble or dispersible in an active hydrogen-containing compound, or can be so dissolved or dispersed by use of a compatibilizer, cosolvent, or other suitable technique, can be used. Exemplary such main chain liquid crystalline polymers include copolymers of, e.g. hydroquinone and terephthaloyl chloride, particularly terpolymers of hydroquinone or aryl-substituted hydroquinones, terephthaloyl chloride and an alkylene oxide, as well as other main chain liquid crystalline polymers such as are described by Blumstein et al, "Structure-Property Relations in Flexible Thermotropic Mesophase Polymers", *Polymeric Liquid Crystals*, Blumstein, ed. Plenum Press, New York (1985).

The liquid crystalline polymer is dissolved or dispersed in an active hydrogen-containing compound. The active hydrogen-containing compound can be of any composition as long as the liquid crystalline polymer is soluble or dispersible therein at beneficial proportions. By "soluble or dispersible at beneficial proportions" it is meant that a sufficient amount the liquid crystalline polymer can be dissolved or dispersed into the active hydrogen-containing compound to provide property or processing improvement to a polyurethane and/or polyurea polymer prepared therefrom. Typically, such improvement is seen when at least about 1, preferably about 1-80, more preferably about 3-60, parts by weight of a dispersed liquid crystalline polymer are present per 100 parts of the active hydrogen-containing compound. When the liquid crystalline polymer is dissolved in the active hydrogen-containing compound, preferably about 1-20, more preferably about 1-10, parts by weight are present per 100 parts of the active hydrogen-containing compound.

The active hydrogen-containing compound in which the liquid crystalline polymer is dispersed is selected according to the properties which are desired in a polyurethane and/or polyurea polymer prepared therefrom. It is well known to employ various equivalent weight and functionality active hydrogen-containing compounds to produce polyurethane and/or polyurea polymers having various properties. For example, in the preparation of elastomeric polyurethanes and/or polyureas, relatively high equivalent weight (400–10,000) and low functionality (2–4 functional) active hydrogen-containing compounds are preferred. For making more rigid polyurethanes and/or polyureas, lower equivalent weight (31–1000), higher functionality (2–16 functional) materials are preferred. The selection of proper active hydrogen-containing compounds for use in preparing particular polyurethane and/or polyurea polymers is considered to be a matter of ordinary choice to one skilled in the art.

Suitable active hydrogen-containing compounds are described in U.S. Pat. No. 4,394,491, incorporated herein by reference. Preferred such compounds are polyether polyols and the corresponding amine-terminated polyethers; polyester polyols; the so-called polymer polyols, particularly those containing dispersed polymers of ethylenically unsaturated monomers, polyurea polymers or polyurethane-polyurea polymers; alkylene glycols and amine-terminated chain extenders as are described in U.S. Pat. No. 4,218,543. Most preferred are polyether polyols having a functionality of about 2–4 and an equivalent weight of about 800–3000, the corresponding amine-terminated polyethers, and copolymer polyols having dispersed polymers of ethylenically unsaturated monomers prepared from such polyether polyols as well as mixtures of these materials with alkylene glycols and/or amine-terminated chain extenders. It has surprisingly been found the the typical reinforcing effects of copolymer polyols are further increased with the use of a liquid crystal-containing polyol.

The liquid crystal-containing polyol or liquid crystal dispersion is formed into a polyurethane and/or polyurea polymer by reaction with a polyisocyanate. Procedures for conducting such reaction are well-known and described, for example, by Ulrich, "Urethane Polymers", *The Kirk-Othmer Encyclopedia of Chemical Technology*, 3rd ed., Vol. 23 pp. 576–608 New York (1983).

Either aromatic or aliphatic organic polyisocyanates having an average of at least 2 isocyanate groups per molecule are useful. Such polyisocyanates are described, for example, in U.S. Pat. Nos. 4,065,410, 3,401,180, 3,454,606, 3,152,162, 3,492,330, 3,001,973, 3,594,164, and 3,164,605, all incorporated by reference.

Aromatic polyisocyanates which are particularly useful herein include 2,4- and/or 2,6-toluene diisocyanate, diphenylmethanediisocyanate, p-phenylene diisocyanate, polymethylenephenylpolyisocyanates, mixtures thereof and the like. Also useful are polymeric derivatives of diphenylmethanediisocyanate as well as prepolymers or quasi-prepolymers thereof.

Particularly useful aliphatic polyisocyanates include, for example, the hydrogenated derivatives of the foregoing aromatic polyisocyanates, as well as hexamethylene diisocyanate, isophoronediisocyanate, 1,4-cyclohexane diisocyanate and the like.

In addition, prepolymers and quasi-prepolymers of the foregoing polyisocyanates having an —NCO content of about 0.5 to about 30% by weight are useful herein.

The polyisocyanate is advantageously present in an amount sufficient to provide the reaction mixture from about 70 to about 500, preferably about 80 to about 150, and more preferably about 95 to about 120 isocyanate groups per 100 active hydrogen-containing groups. Higher amounts of the polyisocyanate can be used when the formation of an isocyanurate-containing polymer is desired.

In general, noncellular polyurethane and/or polyurea elastomers (those having an unfilled density of at least about 0.8 g/cc) are prepared by reacting a relatively high equivalent weight active hydrogen-containing compound (preferably 800–3000 molecular weight) and a chain extender compound with a polyisocyanate. The chain extender compound advantageously has an equivalent weight of from about 31–250 and a functionality of about 2–4, preferably about 2. The chain extender is preferably a glycol or a diamine, with $C_2$–$C_6$ alkylene glycols and stearically hindered aromatic diamines being preferred. In preparing noncellular or microcellular elastomers, a conventional casting process, particularly a solventless casting process, or a reaction injection molding process can be employed. Suitable casting techniques are described, for example, in U.S. Pat. No. 4,556,703. Reaction injection molding techniques are described, for example, in Sweeney, F. M., *Introduction to Reaction Injection Molding*, Technomics, Inc., 1979, incorporated by reference. Suitable formulations for use in RIM processes are described, for example, in U.S. Pat. Nos. 4,269,945, 4,218,610, 4,297,444, 4,530,941, all incorporated by reference. In these formulations substitution of all or a portion of one or more of the active hydrogen-containing compounds with a liquid crystal-containing polyol or a liquid crystal dispersion having a similar equivalent weight functionality and reactivity is made.

In preparing elastomeric polyurethane and/or polyurea polymers, either a one-shot or two-shot (i.e. prepolymer) process can be employed. In the two-shot process, all or most of the relatively high equivalent weight active hydrogen-containing compound is reacted with an excess of a polyisocyanate to form an isocyanate-terminated prepolymer, which is then reacted with the chain extender and any remaining high equivalent weight material. In the one-shot process, most or all of the relatively high equivalent weight material is mixed with the chain extender and the mixture is reacted with the polyisocyanate. However, certain prepolymers and quasi-prepolymers may be empolyed as the polyisocyanate component even in a one-shot process. Preferably, the polyurethane and/or polyurea polymer is cellular, i.e. has an unfilled density of less than about 0.8 g/cc. More preferably, the polyurethane and/or polyurea is a flexible polyurethane foam. Such flexible polyurethane foam is advantageously prepared by reacting a relatively high equivalent weight liquid crystal-containing polyol or liquid crystal dispersion with a polyisocyanate in the presence of a blowing agent. In preparing flexible polyurethane foams, it is advantageous to also employ a sufactant to stabilize the foaming reaction mass and to compatibilize the various components of the reaction mixture, and to employ various catalysts for both the urethane forming and blowing reactions. In addition, a crosslinker such as diethanolamine is often employed to promote rapid initial curing.

In preparing flexible polyurethane foam, the liquid crystal-containing polyol or the major active hydrogen-containing compound(s) in the liquid crystal dispersion advantageously has an equivalent weight of about 800-3000 and an average functionality (defined herein as the number of active hydrogen-containing groups per molecule) from about 2 to about 4, more preferably about 2-3.

Suitable blowing agents for preparing foams are well known and include, for example, water, low boiling halogenated alkanes such as methylene chloride, monochloro-difluoromethane, dichlorodifluoromethane, dichloromono-fluoromethane and the like, the so-called "azo" blowing agents, finely divided solids and the like as well as other materials which generate a gas under the conditions of the foaming reaction. Water, the halogenated methanes or mixtures thereof are preferred. When water is used as the blowing agent, about 0.5 to about 10, preferably about 1 to about 5 parts by weight are used per 100 parts of active hydrogen-containing compound(s). The halogenated alkanes are typically used in an amount from about 5 to about 75 parts per 100 parts by weight of active hydrogen-containing compound(s). However, the use of varying amounts of blowing agents to achieve a desired density is well known in the art, and it may in some instances be advantageous to use amount of blowing agents outside of the ranges mentioned before.

Suitable surfactants include the diverse silicone surfactants, preferably those which are block copolymers of a polysiloxane and a poly(alkylene oxide). Suitable such surfactants include Y-10184 surfactant, available from Union Carbide Corporation, and the like. Surfactants are used in an amount sufficient to stabilize the foaming reaction mixture against collapse until the foam is cured, and to promote the formation of a somewhat uniform cell structure. Typically, about 0.1 to about 5, preferably about 0.3 to about 3 parts by weight of surfactant are employed per 100 parts of active hydrogen-containing compound(s).

Crosslinkers which are commonly employed in preparing flexible polyurethane foams include low equivalent weight alkanolamines such as ethanolamine, diethanolamine, triethanolamine, propanolamine, dipropanolamine, tripropanolamine, methyldiethanol amine, methyldipropanolamine, and the like. Also useful are the alkylene glycols and low equivalent weight hydroxyl-terminated polyols such as glycerine and trimethylol propane. Such crosslinkers are generally used in minor amounts, preferably about 0.2 to about 10, more preferably about 0.5-5 parts per 100 parts of relatively high equivalent weight active hydrogen-containing compounds. Catalysts for preparing polyurethane and/or polyurea foams include organometallic catalysts and tertiary amine compounds. Of the organometallic catalysts, organotin catalysts are generally preferred. Suitable catalysts are described, for example, in U.S. Pat. No. 4,495,081, incorporated herein by reference. When using such catalysts, an amount sufficient to increase the rate of the urethane-forming (and foaming reactions, when a cellular polymer is formed) is used. Typically, about 0.001 to about 0.5 part of an organometallic catalyst is used per 100 parts of active hydrogen-containing compound(s). Tertiary amine-containing compounds are used in amount ranging form about 0.1 to abut 3 parts per 100 parts of active hydrogen-containing material. When polyisocyanurate foams are produced, alkali metal compounds are usefully employed as trimerization catalysts.

The foam can be prepared in any convenient manner. The foam can be prepared by reacting the components in a closed mold, or by permitting the reacting components to freely rise. Processes for preparing polyurethane foams are described, for example, in U.S. Pat. No. 4,451,588, incorporated by reference.

In addition to preparing flexible foams and noncellular elastomers, the liquid crystal-containing polyol of this invention is useful in preparing rigid cellular and noncellular polyurethane and/or polyurea polymers. Methods for making such materials are described, for example, in U.S. Pat. Nos. 4,579,844 and 4,569,951, incorporated herein by reference. Rigid polyurethane foams are advantageously prepared using active hydrogen-containing compounds having an equivalent weight from about 31-400 and an average functionality of about 3-16, preferably about 3 to about 8. The polyurethane and/or polyurea polymers of the invention are useful, for example, as seating, cushioning, inductrial elastomers, automobile fascia and bumpers, thermal insulation and the like.

The following examples are provided to illustrate the invention, but are not intended to limit the scope thereof. All parts and percentages are by weight unless otherwise indicated.

EXAMPLE 1

A. Preparation of unsaturated cholesterolic monomer

In a suitable reactor, 78 grams (0.2 mole) of cholesterol are dissolved in 600 milliliters of freshly distilled toluene. To this solution is added 0.3 ml of an organotin catalyst (T-9, sold by Air Products and Chemicals, Inc.). While stirring at room temperature, a solution of 32 grams of isocyanatoethylmethacrylate (IEM) in 40 ml of toluene is added drop-wise. After all the IEM solution is added, the temperature is raised to 62° C. for two hours. The resulting monomer crystallizes out on cooling. The crystallized monomer is recovered and dried under vacuum at 100° C. for 24 hours. The resulting monomer, which has a melting point of 159° C., has the following structure:

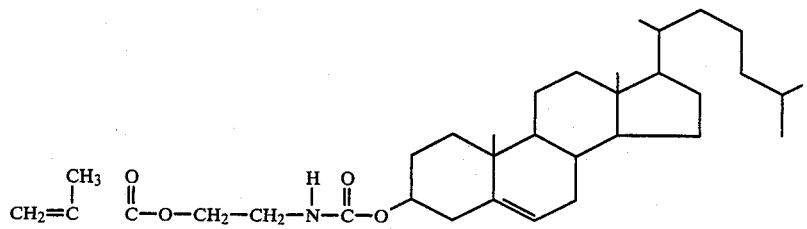

A 2-gram portion of the monomer is dispersed in 20 ml toluene and placed in a 100 ml flask under a nitrogen pad. To this mixture is added 0.04 g (0.02% by weight based on monomer) of azobis(isobutyronitrile). The temperature of the flask is raised to 67° C. for a period of four hours to effect polymerization. The flask is then cooled and the product polymer is precipitated in methanol, filtered and dried.

The dried polymer is examined on a Zeiss universal polarizing-light microscope equipped with a Mettler FP-82 hot stage. A phase change is seen at 240° C. above which the polymer appears as a birefringent fluid. A bluish phase characteristic of the cholesteric liquid crystalline stage is observed at 257° C. under crossed polars. From this observation, it is concluded that the polymer is liquid crystalline.

B. Preparation of Liquid Crystal Dispersion

Into a suitable reactor equipped with a nitrogen pad are mixed 23 grams of the monomer from part A and 295 grams of a 1650 equivalent weight ethylene oxide-capped poly(propylene oxide)(Polyol A). After thorough mixing, the temperature of the mixture is raised to 125° C. Separately, 150 grams of an IEM capped polyol is prepared by reacting IEM with Polyol A at a mole ratio of 0.374. Into the capped polyol is dissolved 0.6 gram of azobis(isobutyronitrile). The resulting solution is slowly added to the reactor over a one hour period at a temperature of 125° C. Upon addition of the initiator solution, the reaction mixture becomes milky in appearance. Following complete addition of the initiator solution, the reaction mixture is heated for an additional 4 hours at 125° C. Following this period, the product is vacuum stripped to remove any volitile impurities. The product is a dispersion containing about 5% of the liquid crystalline polymer.

C. Molded Foam Prepared from Liquid Crystal Dispersion

A molded flexible foam is prepared from the following formulation:

| Component | Parts by Weight |
|---|---|
| Liquid Crystal Dispersion[1] | 100 |
| Water | 3.8 |
| Silicone Surfactant[2] | 1.65 |
| Tertiary Amine Catalyst[3] | 0.24 |
| Catalyst A[4] | 0.12 |
| Organotin catalyst B[5] | 0.0042 |

| Component | Parts by Weight |
|---|---|
| Diethanol amine | 1.7 |
| Toluene diisocyanate[6] | 105 index |

[1]From Example 1-B
[2]Y-10184 silicone surfactant, sold by Union Carbide Corporation
[3]bis(N,N—dimethylaminoethyl)amine
[4]A 33 weight percent solution of triethylenediamine in dipropylene glycol
[5]Dimethyltindilaurate
[6]An 80/20 by weight mixture of the 2,4- and 2,6- isomers The mixture exhibits a rise time of 35 seconds and a cure time of 6 minutes.

The properties of this foam (designated Foam Sample No. 1) are reported in Table 1, which follows Example 2.

EXAMPLE 2

A molded foam is prepared as described in Example 1-C, except the liquid crystal dispersion is replaced with an equal weight of a conventional copolymer polyol containing 10% by weight dispersed styrene/acrylonitrile (70/30 weight ratio) particles. The properties of this foam (designated Comparative Sample No. A) are reported in Table 1 following.

Another molded foam (Sample No. 2) is prepared as described in Example 1-C, except a portion of the liquid crystal dispersion is replaced with a copolymer polyol containing dispersed styrene/acrylonitrile particles (70/30 weight ratio) so that the blended polyols contain 10% by weight dispersed SAN particles and 2.5% by weight dispersed liquid crystalline polymer. The properties of this foam are described in Table 1.

Molded foam Sample No. 3 is prepared as described in Example 1-C, except a portion of the liquid crystal-containing polyol is replaced with a copolymer polyol containing dispersed styrene/acrylonitrile particles (70/30) weight ratio) so that the blended polyols contain 10% by weight dispersed SAN particles and 3% by weight dispersed liquid crystalline polymer. The properties of this foam are described in Table 1.

As can be seen from data in Table 1, the use of even very small amounts of a liquid crystalline polymer provides a substantial increase in modulus.

TABLE I

| Property | 1 | A* | 2 | 3 |
|---|---|---|---|---|
| % LCP[1] | 5 | 0 | 2.5 | 3.0 |
| % CPP solids[2] | 0 | 10 | 10 | 10 |
| Density, lb/ft[3] | 1.88 | 1.87 | 1.93 | 1.94 |
| Tensile Str, psi | 17.1 | 22.8 | 22.5 | 22.1 |
| Elongation, % | 111 | 107 | 114 | 103 |
| Tear Str, pli[4] | 1.59 | 1.81 | 1.57 | 1.90 |
| Resiliency, %[5] | 55 | 55 | 53 | 48 |
| Compresson Set[6] | | | | |
| Ct | 6.6 | 6.6 | 8.0 | 8.5 |
| Cd | 12.9 | 13.1 | 15.6 | 16.7 |
| ILD[7] | | | | |

TABLE I-continued

| Property | 1 | A* | 2 | 3 |
|---|---|---|---|---|
| 25% | 18 | 22 | 24 | 24 |
| 65% | 50 | 53 | 65 | 69 |
| ret 25% | 15 | 17 | 20 | 18 |
| Modulus[8] | 2.78 | 2.41 | 2.71 | 2.88 |
| Air flow[9] | 4.3 | 4.8 | 4.6 | 4.4 |

*Not an example of this invention
[1]LCP is liquid crystalline polymer
[2]% styrene/acrylonitrile particles in the polyol blend
[3]ASTM 3574-81 Test E
[4]ASTM 3574-81 Test F
[5]ASTM 3574-81 Test H
[6]ASTM 3574-81 Test D
[7]ASTM 3574-81 Test B. ILD is indentation load deflection.
[8]Ratio of 65% ILD to 25% ILD.
[9]ASTM 3574-81

EXAMPLE 3

Molded foam Sample No. 4 is prepared according to the general process described in Example 1-C. The polyols used are a blend of a liquid crystal dispersion and a copolymer polyol. This blend is substituted on a weight for weight basis for the liquid crystal dispersion used in Example 1-C. The liquid crystal polymer, which is prepared as described in Example 1B, is of lower molecular weight and is therefore soluble in Polyol A. The copolymer polyol is prepared according to the general process described in copending application of Hoffman, Ser. No. 812,435, filed Dec. 23, 1985. The copolymer polyol is prepared by capping Polyol A with 0.161 moles of IEM per mole of polyol, and copolymerizing the capped polyol with a small portion of styrene and acrylonitrile to form a stabilizer compound which is soluble in additional polyol. A solution of the capped polyol in an additional amount of Polyol A is then used as the base polyol in which additional styrene and acrylonitrile are polymerized in a 70/30 weight ratio to form a copolymer polyol having 35% solids. In making the foam, the copolymer polyol and liquid crystal dispersion are blended at ratios such that the blend has an overall content of dispersed SAN particles of 10% by weight, and contains 3.5% by weight of the liquid crystal polymer. The properties of this foam are as indicated in Table 2 following.

For consumption, a molded foam is prepared in like manner, except the sole polyol used is the copolymer polyol described with respect to Sample No. 4, diluted with Polyol A to 10% solids by weight. The properties of this foam (designated Comparative Sample B) are as described in Table 2 following.

TABLE 2

| Property | B* | 4 |
|---|---|---|
| % CPP solids[1] | 0 | 3.5 |
| Density, lb/ft[2] | 10 | 10 |
| Tensile Str, psi[3] | 1.91 | 2.01 |
| Elongation, % | 20.3 | 24.3 |
| Tear Str, pli[4] | 102 | 107 |
| Resiliency, %[5] | 1.85 | 1.93 |
| Compresson Set[6] | | |
| Ct | 55 | 52 |
| Cd | 12.8 | 14.7 |
| ILD[7] | | |
| 25% | 23 | 25 |
| 65% | 60 | 71 |
| ret 25% | 19 | 20 |
| Modulus[8] | 2.61 | 2.84 |
| Air Flow[9] | 5.6 | 4.2 |

*Not an example of this invention
[1]-[9]Same as 1-9 in Table 1.
[9]ASTM 3574-81

Improved modulus, tensile strength, elongation, ILD and resiliency are seen with the addition of a liquid crystalline polymer.

EXAMPLE 4

Molded foam sample No. 5 is prepared in the same manner as Sample No. 4, except it contains only 2.6% by weight of dissolved liquid crystalline polymer. Its properties are as reported in Table 3 following.

As a further check on the beneficial effects of using a liquid crystal dispersion, a parallel experiment is run, substituting a different, non-mesogenic, soluble addition polymer for the liquid crystalline polymer. This polymer is a preformed stabilizer as described with respect to the preparation of the copolymer polyol in Example 2, except the capping level is only 0.06 moles/mole. This preformed stabilizer is present at a 2.6% by weight level. The properties of this molded foam (designated Comparative Sample C) are as reported in Table 3 following.

For comparison, the properties of Comparative Foam D, made from a copolymer polyol containing 10% solids prepared by polymerizing styrene and acrylonitrile in Polyol A in the presence of the preformed stabilizer used to prepare Comparative Sample C, are reported in Table 3.

The data in Table 3 shows that excellent foam having in particular improved modulus, tensile strength and ILD is prepared according to this invention. The use of the soluble, non-mesogenic polymer does not provide ILD or modulus improvements.

TABLE 3

| Property | C* | D* | 5 |
|---|---|---|---|
| % LCP[1] | 0 | 0 | 2.6 |
| CPP solids[2] | 0 | 10 | 0 |
| Density, lb/ft[3] | 1.91 | 1.98 | 2.08 |
| Tensile Str, psi | 20.9 | 19.5 | 25.1 |
| Elongation, % | 98 | 91 | 96 |
| Tear Str, pli[4] | 2.12 | 1.95 | 1.40 |
| Resiliency, %[5] | 52 | 53 | 52 |
| Compresson Set[6] | | | |
| Ct | 5.9 | 5.0 | 6.0 |
| Cd | 11.6 | 9.7 | 11.8 |
| ILD[7] | | | |
| 25% | 26 | 25 | 25 |
| 65% | 64 | 64 | 71 |
| ret 25% | 20 | 20 | 20 |
| Modulus[8] | 2.46 | 2.56 | 2.84 |
| Air flow[9] | 4.8 | 5.2 | 2.2 |

*Not an example of this invention
[1]-[9]Same as 1-9 in Table 1.

EXAMPLE 5

A. Preparation of Liquid Crystalline Polymer

Into a suitable reactor are placed 65 parts of Polyol A, 119 parts of the IEM-capped polyol described in Example 1-B, and 12.8 parts of a liquid crystalline monomer having the structure

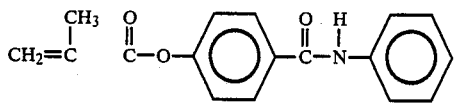

which is separately prepared by reacting methacryloyl chloride with the reaction product of phenylisocyanate and para-hydroxy benzoic acid. This mixture is heated to about 140° C. and to it are added at that temperature, over a period of about one hour, a mixture of 119 parts of the IEM-capped polyol and 0.65 grams azobis-(isobutyronitrile). Following complete addition of the initiator solution, the reaction mixture is heated at about 140° C. for an additional 4 hours. The resulting product is a solution of a polymer of the liquid crystalline monomer in Polyol A.

Six parts of this solution are placed in a reactor along with 14.91 parts of the liquid crystalline monomer and 108 parts of Polyol A. This mixture is heated to a temperature of 140° C., upon which the solid monomer melted. Then, 23 parts of Polyol A in which are dissolved 0.6 part of azobis(isobutyronitrile) and 2.8 parts of the liquid crystalline monomer are added over a period of about 30 minutes at 140° C. following this addition, the mixture is heated for another 30 minutes and cooled. The resulting product is a dispersion of particles of a liquid crystalline polymer in Polyol A.

B. Preparation of Polyurethane Foam

A molded, high resiliency foam (Sample No. 6) is prepared using the formulation described in Example 1-C, except the liquid crystalline dispersion is replaced by a mixture of Polyol A, the liquid crystalline dispersion of Example 5-A, and a copolymer polyol as described with respect to Sample No. 4, except the styrene/acrylonitrile ratio is 80/20. The proportions of these components are such that the mixture contains 10% by weight SAN particles and 2.6% by weight liquid crystalline polymer particles.

For comparison, a molded foam (Comparative Sample E) is prepared using the same formulation, except that the liquid crystalline dispersion of Example 1-C is replaced with the 10% solids copolymer polyol described with respect to Comparative Sample B. The properties of Sample No. 6 and Comparative Sample E area as reported in Table 4 following.

TABLE 4

| Property | E* | Sample No. 6 |
| --- | --- | --- |
| % LCP[1] | 0 | 2.6 |
| CPP solids[2] | 10 | 10 |
| Density, lb/ft[3] | 1.87 | 2.09 |
| Tensile Str, psi | 22.8 | 21.3 |
| Elongation, % | 107 | 139 |
| Tear Str, pli[4] | 1.81 | 2.42 |
| Resiliency, %[5] | 55 | 47 |
| Compression Set[6] | | |
| Cd | 13.1 | 20.9 |
| ILD[7] | | |
| 25% | 22 | 21 |
| 65% | 53 | 64 |
| ret 25% | 17 | 16 |
| Modulus[8] | 2.41 | 3.05 |
| Air Flow[9] | 4.8 | 5.7 |

*Not an example of this invention
[1-9]Same as 1-9 in Table 1

As can be seen from the data in Table 4, very substantial increase in modulus and 65% ILD is obtained with the presence of a small quantity of liquid crystal polymer in the foam formulation.

EXAMPLE 6

Into a suitable reactor are added 789 parts of a mixture of 10% hydroxypropylcellulose (HPC, molar substitution 3.0, molecular weight 60,000) and 90% of an adduct of glycerine and 5.7 moles of ethylene oxide. HPC is known to exhibit a thermotropic liquid crystalline state between 160°-205° C. To this mixture are added 31.6 parts of a 45% aqueous solution of potassium hydroxide, and the water is flashed off. The mixture is heated to 120° C., and a mixture of 807 parts ethylene oxide and 5404 parts propylene oxide are added to the reactor at a rate of about 10 grams/minute. Following addition of the oxides, the reaction mixture is digested for 4 hours at 120° C. The resulting liquid crystal-containing polyol is treated with magnesium silicate and filtered. It is a clear solution having an equivalent weight of 1049.

A flexible polyurethane foam is prepared by mixing 100 parts of this liquid crystal-containing polyol, 1.5 parts of a silicone surfactant, 0.2 parts of an organometallic catalyst, 0.15 parts of a 33% triethylenediamine solution and toluene diamine at a 105 index, and pouring the mixture into a cup where it is permitted to rise. After the rise is complete, the foam is cured at 250° F. for 30 minutes. A good quality foam is obtained.

What is claimed is:

1. A solution or colloidal dispersion of a liquid crystalline polymer in an active hydrogen-containing compound having an average of at least two active hydrogen-containing moieties.

2. The solution or dispersion of claim 1 wherein the active hydrogen-containing compound contains at least two hydroxyl groups per molecule.

3. The solution or dispersion of claim 1 wherein the active hydrogen-containing compound contains at least two primary or secondary amine groups per molecule.

4. The solution or dispersion of claim 1 wherein said liquid crystalline polymer is dissolved in the active hydrogen containing compound, and the solution contains about 1-20 parts of the liquid crystal-containing polymer per 100 parts of active hydrogen-containing compound.

5. The solution of claim 4 wherein the active hydrogen-containing compound comprises a polyether polyol having an average equivalent weight of about 800 to about 3000 and an average functionality of about 2 to about 4.

6. The solution of claim 5 wherein the active hydrogen-containing compound further comprises a glycol and/or aromatic amine chain extender.

7. The solution of claim 4 wherein the active hydrogen-containing compound has an average equivalent weight of about 31 to about 400 and an average functionality of about 3 to about 8.

8. The solution or dispersion of claim 1 wherein said liquid crystalline polymer is colloidally dispersed in the active hydrogen-containing compound, and the dispersion contains about 3 to about 60 parts of liquid crystalline polymer per 100 parts active hydrogen-containing compound.

9. The dispersion of claim 8 wherein the active hydrogen-containing compound comprises a polyether polyol having an average equivalent weight of about 800 to about 3000 and an average functionality of about 2 to about 4.

10. The dispersion of claim 9 wherein the active hydrogen-containing compound further comprises a glycol and/or aromatic amine chain extruder.

11. The dispersion of claim 8 wherein the active hydrogen-containing compound has an average equivalent weight of about 31 to about 400 and an average functionality of about 3 to about 8.

12. The solution or dispersion of claim 1 wherein said liquid crystalline polymer is a polymer of an ethylenically unsaturated derivative of benzoic acid.

13. The solution or dispersion of claim 1 wherein said liquid crystalline polymer is a polymer of an ethylenically unsaturated Schiff base derivative.

14. The solution or dispersion of claim 1 wherein said liquid crystalline polymer is a polymer of an ethylenically unsaturated steroid.

15. The solution or dispersion of claim 14 wherein said liquid crystalline polymer is a polymer of an ethylenically unsaturated cholesterol derivative.

16. The solution or dispersion of claim 15 wherein said liquid crystalline polymer is a polymer of the reaction product of an unsaturated isocyanate and cholesterol.

17. The solution or dispersion of claim 16 wherein said liquid crystalline polymer is a copolymer of the reaction product of an unsaturated isocyanate and cholesterol, and at least one other non-mesogenic copolymerizable monomer.

18. The solution or dispersion of claim 12, 13, 14 or 17 wherein said active hydrogen-containing compound comprises a polyether polyol having an average equivalent weight of about 800 to about 3000 and an average functionality of about 2 to about 4.

19. The solution or dispersion of claim 12, 13, 14 or 17 wherein said active hydrogen-containing compound has an average equivalent weight from about 31 to about 400 and an average functionality from about 3 to about 8.

20. A polyurethane and/or polyurea polymer prepared by reacting a polyisocyanate with a liquid crystal-containing polyol or a solution or dispersion of a liquid crystalline polymer in an active hydrogen-containing compound having an average of least two isocyanate-reactive groups per molecule.

21. The polyurethane and/or polyurea of claim 20 wherein the polyisocyanate is reacted with a solution or dispersion of a liquid crystalline polymer in an active-containing compound having an average of at least two isocyanate-reactive groups per molecule.

22. The polyurethane and/or polyurea polymer of claim 21 wherein wherein the active hydrogen-containing compound contains at least two hydroxyl groups per molecule.

23. The polyurethane and/or polyurea polymer of claim 21 wherein the active hydrogen-containing compound contains at least two primary or secondary amine groups per molecule.

24. The polyurethane and/or polyurea polymer of claim 21 herein said liquid crystalline polymer is dissolved in the active hydrogen containing compound, and the solution contains about 1-20 parts of the liquid crystal-containing polyol per 100 parts of active hydrogen-containing compound.

25. The polyurethane and/or polyurea polymer of claim 24 wherein the active hydrogen-containing compound comprises a polyether polyol having an average equivalent weight of about 800 to about 3000 and an average functionality of about 2 to about 4.

26. The polyurethane and/or polyurea polymer of claim 25 wherein the active hydrogen-containing compound further comprises a glycol and/or aromatic amine chain extender.

27. The polyurethane and/or polyurea polymer of claim 24 wherein the active hydrogen-containing compound has an average equivalent weight of about 31 to about 400 and an average functionality of about 3 to about 8.

28. The polyurethane and/or polyurea polymer of claim 21 wherein said liquid crystalline polymer is colloidally dispersed in the active hydrogen-containing compound, and the dispersion contains about 3 to about 60 parts of liquid crystalline polymer per 100 parts active hydrogen-containing compound.

29. The polyurethane and/or polyurea polymer of claim 28 wherein the active hydrogen-containing compound comprises a polyether polyol having an average equivalent weight of about 800 to about 3000 and an average functionality of about 2 to about 4.

30. The polyurethane and/or polyurea polymer of claim 29 wherein the active hydrogen-containing compound further comprises a glycol and/or aromatic amine chain extender.

31. The polyurethane and/or polyurea polymer of claim 28 wherein the active hydrogen-containing compound has an average equivalent weight of about 31 to about 400 and an average functionality of about 3 to about 8.

32. The polyurethane and/or polyurea polymer of claim 21 wherein said liquid crystalline polymer is a polymer of an ethylenically unsaturated derivative of benzoic acid.

33. The polyurethane and/or polyurea polymer of claim 22 wherein said liquid crystalline polymer is a polymer of an ethylenically unsaturated Schiff base derivative.

34. The polyurethane and/or polyurea polymer of claim 21 wherein said liquid crystalline polymer is a polymer of an ethylenically unsaturated steroid.

35. The polyurethane and/or polyurea polymer of claim 34 wherein said liquid crystalline polymer is a polymer of an ethylenically unsaturated cholesterol derivative.

36. The polyurethane and/or polyurea polymer of claim 35 wherein said liquid crystalline polymer is a polymer of the reaction product of an unsaturated isocyanate and cholesterol.

37. The polyurethane and/or polyurea polymer of claim 36 wherein said liquid crystalline polymer is a copolymer of the reaction product of an unsaturated isocyanate and cholesterol, and at least one other non-mesogenic copolymerizable monomer.

38. The polyurethane and/or polyurea polymer of claim 32, 33, 34, or 37 wherein said active hydrogen-containing compound comprises a polyether polyol having an average equivalent weight of about 800 to about 3000 and an average functionality of about 2 to about 4.

39. The polyurethane and/or polyurea polymer of claim 38 which is a flexible foam.

40. The polyurethane and/or polyurea polymer of claim 38 wherein said polyisocyanate is reacted with said solution or dispersion in the presence of a blowing agent, a catalyst, and a silicone surfactant.

41. The polyurethane and/or polyurea polymer of claim 40 wherein said polyisocyanate comprises toluene-diisocyanate, diphenylmethanediisocyanate, or a derivative or prepolymer thereof.

42. The polyurethane and/or polyurea polymer of claim 20 wherein said polyisocyanate is reacted with a liquid crystal-containing polyol.

43. The polyurethane and/or polyurea polymer of claim 42 wherein said liquid crystal-containing polyol is a hydroxyalkylcellulose-initiated polyether.

44. The polyurethane and/or polyurea polymer of claim 42 wherein said liquid crystal-containing polyol is the reaction product of an ethylenically unsaturated polyether, an ethylenically unsaturated liquid crystalline monomer and a secondary monomer containing both ethylenic unsaturation and an isocyanate-reactive group.

45. A crosslinked, noncellular or microcellular polyurethane and/or polyurea polymer containing a liquid crystalline polymer.

46. A crosslinked, noncellular or microcellular polyurethane and/or polyurea polymer which is prepared from a liquid crystal-containing polyol.

47. The polyurethane and/or polyurea polymer of claim 46 which is prepared by a reaction injection molding process.

48. The polyurethane and/or polyurea polymer of claim 46 which is prepared by a solventless casting process.

49. A polyurethane and/or polyurea foam containing a liquid crystalline polymer.

50. A polyurethane and/or polyurea foam which is prepared from a liquid crystal-containing polyol.

* * * * *